United States Patent

Lepri et al.

[11] Patent Number: 5,127,076
[45] Date of Patent: Jun. 30, 1992

[54] JOINT FOR OPTICAL CABLES AND METHOD OF MAKING SUCH JOINT

[75] Inventors: Luciano Lepri, Rho; Alessandro Ginocchio, Sesto S. Giovanni, both of Italy

[73] Assignee: Pirelli Cavi S.p.A., Milan, Italy

[21] Appl. No.: 671,537

[22] Filed: Mar. 19, 1991

[30] Foreign Application Priority Data

Mar. 20, 1990 [IT] Italy .................. 19720 A/90

[51] Int. Cl.⁵ .............................. G02B 6/38
[52] U.S. Cl. ............................ 385/111; 385/95; 385/104
[58] Field of Search ............ 350/96.20, 96.21, 96.22, 350/96.23; 385/95-99, 100, 102, 104, 109, 111

[56] References Cited

U.S. PATENT DOCUMENTS

| | | | |
|---|---|---|---|
| 4,108,534 | 8/1978 | LeNoane et al. | 350/96.21 |
| 4,110,000 | 8/1978 | Bogar et al. | 350/96.21 |
| 4,388,800 | 6/1983 | Trezeguet et al. | 350/96.23 X |
| 4,441,786 | 4/1984 | Hulin et al. | 350/96.21 |
| 4,474,426 | 10/1984 | Yataki | 350/96.23 |
| 4,960,318 | 10/1990 | Nilsson et al. | 350/96.23 |

Primary Examiner—John D. Lee
Attorney, Agent, or Firm—Brooks Haidt Haffner & Delahunty

[57] ABSTRACT

A joint, and a method for forming such joint, between two optical fiber cables or cores having closed-helix grooves each loosely receiving at least one optical fiber. A cylindrical body having open-helix grooves is interposed between the two cores so that the latter grooves interconnect corresponding grooves of the cores. The ends of the optical fibers are joined, and the fibers are then placed in the grooves of the cylindrical body.

9 Claims, 1 Drawing Sheet

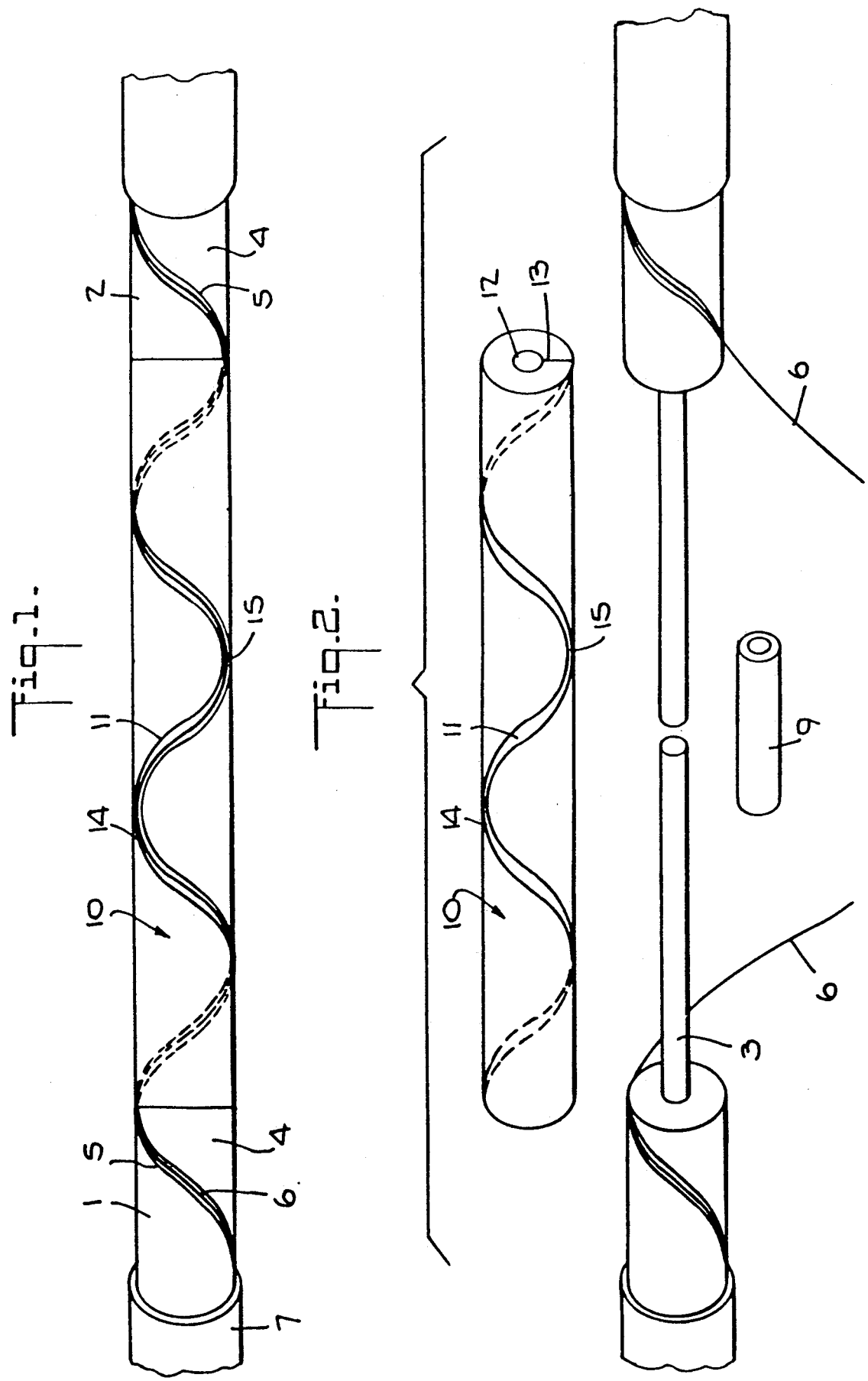

JOINT FOR OPTICAL CABLES AND METHOD OF MAKING SUCH JOINT

FIELD OF THE INVENTION

The present invention relates to joints designed to connect optical cables and optical cable cores of the type in which said cores include a member of cylindrical section which is provided, on the outer surface thereof, with at least a groove extending in the form of a closed helix along said surface and within which at least one optical fiber is loosely received.

The present invention also relates to the method of making such joints.

BACKGROUND OF THE INVENTION

It is known that optical cables in which the core comprises a member of cylindrical section and which is provided, on the outer surface thereof, with grooves extending in the form of a helix along said surface are divided into two groups.

The first group comprises cables in which the grooves present on the outer surface of the member of cylindrical section extend in the form of a closed helix whereas the other group comprises cables having grooves in the form of an open helix.

By the term "closed helix", it is herein meant that all turns of the helix are oriented in the same way and all have an S-shaped or Z-shaped configuration. By the term "open helix", it is herein meant that adjacent portions of the helix extend in two directions, and therefore, that the helix is formed with S-shaped turns or Z-shaped turns which are disposed alternately with each other.

It is known that for equal diameter sizes of the core and equal the pitch, shape and sizes of the grooves, the cables in which said grooves have the form of a closed helix permit a greater excess length of the optical fibers in said grooves, that is, a greater excess with respect to the length of the core axis, as compared with the cables in which the grooves have the form of an open helix. The reason for this difference will be explained hereinafter.

The maximum permissible excess length of an optical fiber in a helix-shaped groove is directly proportional to the difference between the length of a fiber which engages, throughout its length, the surface closing the outside of said groove (herein also referred to as "line of maximum groove extension") and the length of a fiber which engages the bottom line of the groove throughout its length.

In an open-helix groove, there are a number of portions in which the bottom line thereof and the line of the maximum groove extension are parallel to the cable axis, and this occurs at the junction portions betwene each S-shaped turn and each Z-shaped turn.

In these junction portions, the length of the bottom line of the groove is equal to the length of the maximum extension line in said groove.

On the contrary, in a closed-helix groove, where the turns are oriented in the same way, there is no portion in which the optical fiber axis, the bottom line of the groove and the maximum extension line of the groove are parallel to the cable axis, and therefore, at all axial positions the maximum extension line of the groove is always longer than the bottom line of the same.

As a result, the difference in length between the maximum extension line and the bottom line in an open-helix groove is shorter than the difference between them in a closed-helix groove, and therefore, in the latter, the maximum permissible excess length of a fiber which can be given to an optical fiber is inherently greater than that permitted in the open-helix grooves.

The advantage of permitting a greater excess length of the optical fibers of cables having a core provided with closed-helix grooves in which the optical fibers are loosely housed, as compared with cables of the same type in which the grooves for loosely housing the optical fibers having an open-helix configuration, is practically reduced to zero due to the impossibility of executing joints in which the outer diameters are the same as the outer diameters of the cables without running the risk of damaging the optical fibers and when using the usual butt welding techniques between the optical cable fibers so as to practically recreate the same structure in the joint as is in the core. For example, as disclosed in U.S. Pat. No. 4,842,438.

In fact, as stated in said Patent, by interposing a cylindrical body provided with the same grooves as those of the cable cores to be united, and therefore, in the case of cables having a core provided with closed-helix grooves necessarily has closed-helix grooves oriented in the same way as those of the cable cores, it is impossible, once the junctions between the end portions of the optical cable fibers have been carried out, to introduce said junction portion into the grooves of the cylindrical body connecting said cable cores without exceeding the maximum excess length value permissible to an optical fiber. As is known, if the excess length exceeds the permissible length, there is a risk of microbending of the optical fibers in the groove receiving it which is deleterious.

This is due to the fact that by using a portion in the joint area provided with closed-helix grooves like those of the cable core, the portion of optical fibers designed to carry out the continuity between the optical fibers in the joint, first of all, must necessarily be arranged in the form of a closed helix about the axis of the joint. Secondly, said portion must be of greater length than that of the maximum extension line of the groove in order to enable the welding devices to carry out the welding between the optical cable fibers because of the bulkiness of said devices.

For such reason, in the case of joints between optical cables of the type in which the cores have the grooves designed to receive the optical fibers in the form of a closed helix, complicated structures of joints are proposed, such as the one disclosed in the Japanese Patent Application No. 55-95917.

The use of complicated structures for joints of optical cables, the cores of which are provided with closed-helix grooves, gives rise to important difficulties during the laying of these cables, particularly, when they are used in a submarine environment. This is due to the radial bulkiness of the joints present therein which causes difficulties in passing the joints through the pulleys of the devices designed to carry out the laying.

BRIEF SUMMARY OF THE INVENTION

The present invention has, as one object, the solving of the problem of producing joints between optical cables of the type having a core provided with closed-helix grooves for receiving the optical fibers without the necessity of resorting to complicated structures and procedures for said joints.

In accordance with the present invention, a joint for connecting optical cables and/or optical cable cores of the type comprising a member of cylindrical section provided with grooves and/or cavities extending in the form of a closed helix therealong and in each of which at least one optical fiber is received is characterized by the fact that interposed between the two cable cores, is a cylindrical body which is coaxial with said cores and which is provided at its outer surface with open-helix grooves, each groove connecting corresponding closed-helix grooves and/or cavities of the two cable cores to each other.

The present invention also includes a method of carrying out junctions in optical fiber cables and/or optical cable cores of the type comprising a member of cylindrical section provided with grooves and/or cavities extending in the form of a closed helix therealong and in each of which at least one optical fiber is loosely received, said method comprising the step of interposing a cylindrical body provided with open-helix grooves between the facing ends of the members of cylindrical section and fastening said cylindrical body thereto, said open-helix grooves interconnecting the closed-helix grooves and/or cavities of one member of cylindrical section of one cable core with the corresponding closed-helix grooves of the other member.

BRIEF DESCRIPTION OF THE DRAWINGS

Other objects and advantages of the present invention will be apparent from the following detailed description of the presently preferred embodiments thereof, which description should be considered in conjunction with the accompanying drawings in which:

FIG. 1 is a perspective view of the joint of the invention; and

FIG. 2 is an exploded view of the joint of FIG. 1 showing the structure thereof.

The joint shown in FIGS. 1 and 2 connects two optical fiber cables 1 and 2 having the same structure and size, to each other.

The structure of the particular cables shown in FIGS. 1 an 2 is merely illustrative, the invention being applicable to cables of different structures.

In the radially innermost area of cables 1 and 2, there is an element mechanically resistant, at least to stresses applied to the cables during their manufacture, and consisting of metallic cords or wires 3, for example.

Alternatively, the cord 3 may consist of spun yarns such as, for example, aliphatic or aromatic polyamide resins or fiberglass or can be a fiberglass-reinforced plastic rod.

A cylindrical section member 4 made of plastic material, such as, for example, a polyolefin or the like, encircles the cord 3.

According to an alter embodiment, the cylindrical section member 4 is made of a metallic material, and in this case, the mechanically resistant element 3 is omitted.

The cylindrical section member 4 constituting the core both of cable 1 and cable 2 has a groove 5 on its radially outermost surface which extends longitudinally to the core itself and has a closed-helix configuration, for example, according to a helix having S-shaped turns all of them oriented in the same way, as shown in the figures.

According to alternative embodiments the groove 5 can be Z-shaped turns or, in place of the grooves, the cables can have fiber-housing cavities extending along the same according to a closed-helix configuration.

Preferably, the groove 5 is of the same size and pitch in both cores 4 of cables 1 and 2. For example, said groove 5, in a section normal to its axis has the form of an arc of a circle having a radius of 1 mm, a pitch of 70 mm and is formed on the radially outermost surface of a polyethylene section member having a cylindrical form in a section perpendicular to the axis of said section member, the section radius being of 3 mm.

Still by way of example only, the groove 5 can be of a substantially rectangular form in a section normal to its axis, having a width and depth of 1 mm and a rounded bottom of 0.5 mm of radius.

An optical fiber 6 is loosely received in the grooves 5 of cores 4 in cables 1 and 2. However, several fibers can also be received in the same groove 5.

A tape, for example, of plastic material, is wound about the cylindrical section members 4 forming the cable 1 and 2 cores so as to provide a continuous layer about the cables which will also close the grooves 5.

In a radially outer position relative to the tape windings 7, other layers of known type surrounding the optical fiber cables can be present, but such layers have not been shown as they do not form part of the present invention.

In particular, when the cord 3 occupying the radially innermost position in cables 1 and 2 does not possess enough mechanical strength to resist the stresses applied during the cable laying, one of the layers disposed about the tape winding 7 is at least a mechanically resistant layer formed with metallic cords or tapes, for example, made of steel or steel alloys or of spun yarns such as aliphatic or aromatic polyamide resins and similar materials having a high mechanical strength.

In addition, in the case in which cables 1 and 2 are intended for use as submarine cables one of the layers radially outward of the tape winding 7 is a sealing sheath, for example, a metallic sheath.

In the particular embodiment of a joint in accordance with the present invention shown in the drawing, the facing ends of cables 1 and 2 have the respective components bared stepwise along a portion thereof. In particular, the ends of both cable 1 and 2 have bare portions of the cords 3, the members 4 of cylindrical section and the ends of the optical fibers 6 accommodated in the grooves 5 of said members 4 of cylindrical section.

In the joint shown in the drawing, the bare portions of the cords 3 are mechanically butt joined by a clamp 9 or alternatively, by a weld or similar elements capable of recreating a mechanical continuity between said metallic cords 3.

A cylindrical body 10 of a desired material, but preferably, of a plastic material, such as a polyolefin, is located over the junction area of the cords 3, and the outer surfaces of said body 10 is aligned with the outer surfaces of the cylindrical section members 4 of cables 1 and 2.

To the ends of the present invention, an essential feature that the cylindrical body 10 must possess is at least an open-helix groove 11 on the surface thereof, that is, a groove formed with alternate S-shaped and Z-shaped portions connecting to each other the grooves 5 of the members 4 of cylindrical section forming the cores of cables 1 and 2 so as to achieve continuity between said cable grooves 5.

In particular, the open-helix groove 11 has, at both ends of the cylindrical body 10, a helix shape oriented in the same way as the helix shape possessed of the grooves present in the cores 4 of the cables joined to each other at the joint.

Said end portions of the groove 11, besides being oriented in the same way as the closed-helix grooves in the cable cores, preferably, also have the same pitch.

The intermediate portion of groove 1, which is in the form of an open helix provides at least two helix inversions 14 and 15, and in general, a helix-inversion number which is a multiple of two.

In addition, the open-helix portion included between the two inversions can be of any number of half-pitches and even of a single helix half-pitch as shown in the drawing.

The choice of the number of half-pitches in the open-helix groove between at least two helix inversions depends on many factors, among which are the diameter sizes of the grooved cores, the shape, depth and pitch of the groove and the sizes of the tool used to carry out the butt welding of the optical fibers.

In spite of all the involved factors, a person skilled in the art is capable of selecting, in all practical cases, the number of half-pitches which will enable him to conveniently carry out the weldings between the optical fibers while avoiding exceeding the maximum permissible length of the optical fibers in the open-helix groove designed to accommodate it.

In fact, once the person skilled in the art knows the bulkiness of the particular tool to be adopted for carrying out the welding between the optical fibers, he establishes the amount of the radial distance he wishes to have between the joint axis and the area where the optical fibers are to be welded together.

When such distance is known, the length of the two end portions of the optical fibers extending from the cables is automatically determined by the fact that after the butt welding between the fibers has been carried out the resulting continuous portion of optical fiber disposed parallel to the joint axis must have said distance as the maximum one.

The length of the continuous portion of optical fiber resulting after the butt welding together the ends of the optical cable fibers has been carried out in respect of the above condition must not be greater than the length of the maximum extension line of the open-helix groove of the joint body designed to receive it in order to avoid the maximum permissible length of the optical fiber being exceeded in the groove.

Therefore, the number of half-pitches of the open-helix groove portion comprised between the two helix inversions will be established so that the length of the maximum extension line of the groove in said portion be not greater than the length of the continuous portion of optical fiber achieved with the butt welding of the end portions of the optical cable fibers.

Housed within the groove 11 are the end portions of the optical fibers 6 of the two cables 1 and 2 and the junction between the fibers, usually consisting of a butt welding between the optical fibers.

The joint in accordance with the invention is obtained by a method also falling within the scope of the present invention which is described hereinafter.

After stepwise baring, in a known manner, all components at the ends of the cables to be connected in the joint, first the mechanical connection of the cords 3 of the cables is carried out by means of a tubular clamp 9 for example.

When this operation is over, an essential step of the process takes place, that is, the interposition of a cylindrical body 10 between the members 4 of cylindrical section forming the cores of the two cables 1 and 2 and the fastening of said body 10 thereto by any conventional means such as plastic welding, an adhesive, etc. Said cylindrical body has the same diameter as said members of cylindrical section but it has grooves exhibiting an open-helix extension with end portions oriented in the same way as the closed-helix grooves of the cables to be joined and with a middle portion in which helix inversions in the number of two or a multiple of two are present.

In addition, during the above essential step, in order to carry out a connection between the grooves 5 of the members 4 of cylindrical section of the two cable cores, the groove 11 of the cylindrical body 10 is disposed so as to create a continuity.

The cylindrical body 10 can be made in any manner, for example, by molding or extrusion so that, besides having at least an open-helix groove on the radially outer surface thereof, it also has a bore 12 at its axis, capable of receiving cords 3 of the cables, and a radial slit 13 in its wall in order to enable the body 10 to be fitted on the bared ends of said cords 3 of cables 1 and 2 which cords are mechanically connected together by the clamp 9.

When such step of the process of the invention has been carried out, the end portions of the optical fibers belonging to the two cables and projecting from the faced ends thereof are put in alignment with the axis of the cables and connected to each other by means of a butt welding.

When the optical fibers have been butt welded, or they have been connected by adopting other known techniques, such as, for example, a microconnector, provided that it also may be loosely housed in the groove 11, the optical fibers are laid down in the open-helix groove 11 of the cylindrical body 10.

The process is completed by the next step, known per se, of reestablishing the continuity of all components existing about the core of cables 1 and 2 and in particular, the winding tape 7.

From the above description relating to a preferred embodiment of a joint and to a method of making it, it can be understood that all of the stated purposes of the invention are achieved.

The interposition of a cylindrical body between the two cable cores provided with closed-helix grooves for loosely accommodating the optical fibers, which cylindrical body has the same outer diameter as that of said cores and is provided with open-helix grooves connecting the grooves of the cable cores, enables a continuity to be recreated between the cores of said cables without imposing any increase in diameter in the joint area.

In addition, since the open-helix configuration of the grooves enables the optical fibers to be housed therein without forcing the fibers to be previously wound about the axis of the body in which said grooves are formed, it is possible to carry out the connection between the end portions of the optical fibers after merely disposing them parallel to the axis of the cables and lay them down in the open-helix grooves of the body interposed therebetween without exceeding the maximum length permissible for the optical fibers in the grooves.

The interposition of a body provided with open-helix grooves between the cores of the cables exhibiting closed-helix grooves for receiving the optical fibers not only enables joints of an outside diameter equal to the diameters of the cables joined to be achieved, but also avoids the use of complicated and difficult structures for accomplishing junctions between optical fiber cables of the type described.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. A joint between a pair of optical fiber cable cores, each core having a plurality of peripherally spaced closed helix grooves at its periphery and at least one optical fiber loosely received in each groove, said joint comprising a member having substantially the same exterior size and shape as said cores, extending from one said core to the other said core and having a plurality of open-helix grooves, corresponding in number to the number of grooves in said cores, which respectively interconnect grooves in one of said cores with corresponding grooves in the other of said cores, each of said open-helix grooves loosely receiving at least one said optical fiber of one of said cores joined to an optical fiber of the other of said cores.

2. A joint as set forth in claim 1 wherein said cores are cylindrical and said member is cylindrical and coaxial with said cores.

3. A joint as set forth in claim 1 wherein one end of said member adjoins one of said cores and the other end of said member adjoins the other of said cores, the groove portions at said one end of said member are an extension of, and are oriented in the same direction as, the grooves in said one of said cores, the groove portions at said other end of said member are an extension of, and are oriented in the same direction as, the grooves in said other of said cores and at least one portion of said grooves in said member intermediate said groove portions at the ends thereof are oriented differently from the grooves in said cores.

4. A joint as set forth in claim 3 wherein said one portion of said grooves is oriented oppositely to the orientation of said grooves at the end portions of said member.

5. A joint as set forth in claim 1 wherein the grooves in each core are oriented in the same direction 6. A joint as set forth in claim 1 wherein the lengths of the joined optical fibers loosely received in said open-helix grooves of said member have a length greater than the bottoms of said open-helix grooves but not greater than the length of the line of maximum extension of said open-helix grooves whereby the optical fibers are free to move in said open-helix grooves and the size of the joint is not greater than the size of said cores.

7. The method of interconnecting optical fibers loosely received in closed-helix grooves at the periphery of one optical fiber cable core with optical fibers loosely received in closed-helix grooves at the periphery of a second optical fiber cable core, said method comprising:

providing a joining member of a predetermined axial length with open-helix grooves at its periphery which correspond in number to the grooves in said one core and said second core and having spacings and orientation at the opposite ends of said member corresponding respectively to the spacing and orientation of the grooves of said one core and said second core;

providing lengths of the optical fibers of said one core extending beyond the end of said one core and lengths of the optical fibers of said second core extending beyond the end of said second core, the sum of the length of each of the optical fibers of said one core and of the length of each of the optical fibers of said second core being at least equal to the length of the bottom of the grooves in said joining member;

placing said joining member intermediate the ends of said cores with the grooves at said one end thereof aligned with said grooves in said one core and with the grooves at said other end thereof aligned with said grooves in said second core;

at least when that said joining member is so placed, joining the ends of said optical fibers extending from said one core with respective ends of said optical fibers extending from said other core, the length of each optical fiber joined to another fiber between said end of said one core and said end of said other core being at least equal to said length of the bottom of said grooves of said joining member but not greater than the length of the line of maximum extension of said grooves of said joining member; and placing the joined optical fibers in respective said grooves of said joining member.

8. A method as set forth in claim 7 further comprising closing at least said grooves in said joining member, after the joined fibers have been placed therein, with a layer of plastic material.

9. A method as set forth in claim 7 wherein said joining member has at least two helix inversions of said grooves thereof.

* * * * *